(12) United States Patent
Bache

(10) Patent No.: US 6,294,085 B1
(45) Date of Patent: Sep. 25, 2001

(54) SEWAGE SCREENING APPARATUS

(75) Inventor: John Cedric Bache, Stourbridge (GB)

(73) Assignee: Jones and Attwood Limited (GB)

( * ) Notice: Subject to any disclaimer, the term of this patent is extended or adjusted under 35 U.S.C. 154(b) by 0 days.

(21) Appl. No.: 09/522,566

(22) Filed: Mar. 10, 2000

(30) Foreign Application Priority Data

Mar. 19, 1999 (GB) ................................................ 9906470

(51) Int. Cl.$^7$ ................................................ B01D 33/04
(52) U.S. Cl. ...................... 210/155; 210/158; 210/160; 210/400
(58) Field of Search ..................... 210/155, 158, 210/159, 160, 391, 394, 400

(56) References Cited

U.S. PATENT DOCUMENTS

| | | | |
|---|---|---|---|
| 1,710,605 | * | 4/1929 | Bole ........................................ 210/158 |
| 2,996,189 | * | 8/1961 | Salterbach ............................ 210/155 |
| 4,186,091 | * | 1/1980 | Sutton .................................... 210/158 |
| 4,597,865 | * | 7/1986 | Hunt et al. ............................ 210/394 |
| 4,634,524 | * | 1/1987 | Huber ................................... 210/158 |
| 4,812,231 | * | 3/1989 | Wiesemann .......................... 210/159 |
| 4,935,131 | * | 6/1990 | Pindar ................................... 210/160 |
| 5,102,536 | * | 4/1992 | Wiesemann .......................... 210/155 |
| 5,641,360 | * | 6/1997 | Bischof . | |
| 5,993,651 | * | 11/1999 | Wiesemann .......................... 210/160 |

FOREIGN PATENT DOCUMENTS

557030 * 8/1993 (EP) .

* cited by examiner

*Primary Examiner*—Christopher Upton
(74) *Attorney, Agent, or Firm*—Andrus, Sceales, Starke & Sawall

(57) ABSTRACT

A sewage screening apparatus which receives, in use, a sewage flow comprising a screen arrangement having a continuous belt screen for capturing screenings contained within the sewage flow to enable their subsequent removal therefrom. The apparatus also includes an impeller for generating a turbulence effect within the sewage flow to effect washing of the screenings contained within the sewage flow prior to their removal therefrom. The impeller is located within the screen arrangement.

13 Claims, 6 Drawing Sheets

SEWAGE SCREENING APPARATUS

The invention relates to a sewage screening apparatus, for removing solid materials from a sewage flow.

It is recognised that the effluent flow entering a sewage treatment plant contains solid materials, such as rags, paper, polythene and other plastic sheeting, and the like, which cannot be processed by the treatment plant. Solids can be removed from the flow by screens or sieves which capture the solids. The screens or sieve are then periodically or continuously operated for cleaning to remove the captured solids, commonly referred to as screenings, for disposal. One such screening apparatus known in the art is the "continuous-belt screen" which includes a continuous driven belt screen presenting a continuous, moving screening area to the input sewage flow to effect removal of screenings within the sewage flow.

It is inevitable that faecal materials from the effluent flow entering the sewage treatment plant will become entrapped with the screenings. In order to improve the working environment of personnel handling the extracted screenings and to minimise potential health hazards, it is desirable that screenings removed from the flow are as free as possible from any faecal material.

A solution to the problem of cleaning screenings is described in EP 0 557 030. Using this technique, screenings are passed through a washing apparatus following their removal from the main sewage flow. The washing apparatus includes a tank into which screenings removed from the effluent flow are introduced along with aqueous liquid. A rotating impeller generates turbulence within the aqueous liquid in the tank resulting in a break down of the faecal contaminants.

EP 0 592 508 describes an alternative apparatus for cleaning screenings to be removed from a sewage flow. In this apparatus, removal of the screenings is effected by means of a screw conveyor having a perforated trough through which sewage in the liquid phase passes. An agitator, in the form of an impeller device, is used to create a turbulent effect in the sewage flow. The turbulence effect causes faecal contaminants to be washed from the screenings prior to their entry to the screw conveyor and their subsequent removal from the flow. The screenings cannot pass through the perforated trough and are compacted by the screw conveyor for subsequent disposal from the apparatus.

A disadvantage of the apparatus is that it has a relatively low sewage flow capacity and, typically, the apparatus can only be used with sewage flow rates of less than 300–400 liters per second. Thus, the apparatus is not well suited for use as a primary sewage screening system. In particular, the apparatus cannot be employed in a sewage treatment plant serving areas where it is necessary to process a large sewage flow, such as areas of high population. Furthermore, the washing action is effected by repeatedly removing and reintroducing screenings into the region of turbulence by periodically reversing the direction of the screw conveyor during operation. Repeatedly reversing the direction of the screw conveyor in this way is mechanically inconvenient.

It is an object of the present invention to provide an apparatus for removing washed screenings from a sewage flow which has an increased sewage flow capacity. It is a further object of the invention to provide such an apparatus in which washing of the screenings can be achieved in a more convenient manner.

According to the present invention there is provided a sewage screening apparatus comprising;

a screen arrangement having a continuous belt screen for capturing screenings contained within the sewage flow to enable their subsequent removal therefrom; and impeller means for generating a turbulence effect within the sewage flow to effect washing of the screenings contained within the sewage flow prior to their removal therefrom, wherein the impeller means is located within the screen arrangement.

The apparatus has a large flow capacity by virtue of the large screening area presented by the continuous belt screen. The apparatus therefore provides the advantage that it can be used for screening a high volume sewage flow. It is therefore particularly suitable for use in a sewage treatment plant serving highly populated areas. Furthermore, owing to the increased sewage flow capacity, the apparatus is suitable for use as a primary sewage screening apparatus, where screenings are washed in the main sewage channel prior to their removal therefrom.

The screen arrangement has a base region at its lower part and a head space at its upper part. The apparatus may include one or more rotary impeller for generating a turbulence effect within the sewage flow. Preferably, the impeller is arranged within the base region of the screen arrangement.

On introduction of the sewage flow into the screen arrangement, the base region of the arrangement becomes flooded with liquid sewage. The screenings to be removed from the sewage flow remain waterborne within the sewage flow for a period of time, prior to their removal from the flow, during which time they are continuously subjected to the turbulence action generated by the rotary impeller. The containment of the screenings within the turbulence region in this way results in an effective washing action.

In addition to the separation of faecal contaminants from the screenings by washing, the turbulence created by the impeller has a liquefying effect on the separated contaminants such that, when liquefied, they can pass through the belt screen with the liquid phase of the sewage to the subsequent processing stages. The retention of faecal contaminants within the liquid sewage flow ensures that the biological loading for the treatment plant is sustained.

The present invention also provides the advantage that, should the impeller fail, operation of the screen arrangement can continue. In conventional systems, in which the screen arrangement delivers unwashed screenings to a separate washing apparatus, failure of the washing apparatus can lead to prolonged system down-time as operation of the screen arrangement has to cease whilst the washing apparatus is repaired or replaced.

Preferably, the rotary impeller is driven by a motor located outside the screen arrangement.

Screenings removed from the input sewage flow are washed prior to their removal from the screen arrangement by the turbulence generated by the impeller. The screenings can therefore be handled more safely by operating personnel following removal of the screenings from the apparatus without the need for a second, subsequent stage for washing the removed screenings. The screenings to be removed from the sewage flow may include rags, papers, plastic materials and stones which cannot be processed by the subsequent processing stages of the sewage treatment plant.

The screen arrangement includes a back plate, at the rear of the arrangement, on which the impeller may be mounted such that the impeller is located within the screen arrangement. One or more impellers may be located within the screen arrangement.

The belt screen passes through the head space of the screen arrangement. The apparatus also includes a drive mechanism for driving the belt screen, the drive mechanism being mounted externally of the screen arrangement. It is usual in conventional continuous belt screen arrangements for the drive mechanism to take the form of a driving wheel located within the head space of the screen arrangement. Mounting the driving mechanism externally of the screen arrangement provides the advantage that brushing means, such as a rotary brush, may be housed within the head space to effect removal of screenings from the belt screen as it is passed therethrough. Additionally, by mounting the drive mechanism externally, contamination by the sewage flow is avoided.

According to another aspect of the invention, two or more screen arrangements may be employed within the main sewage channel to provide an increased sewage flow capacity, each screen arrangement having a continuous belt screen for capturing screenings to be removed from the sewage flow. Impeller means may be located within each of the screen arrangements.

The apparatus may include a screw compactor into which washed screenings, removed from the or each screen arrangement, are discharged for dewatering and compaction prior to disposal.

The invention will now be described, by way of example only, with reference to the following drawings in which.

Figure 1:
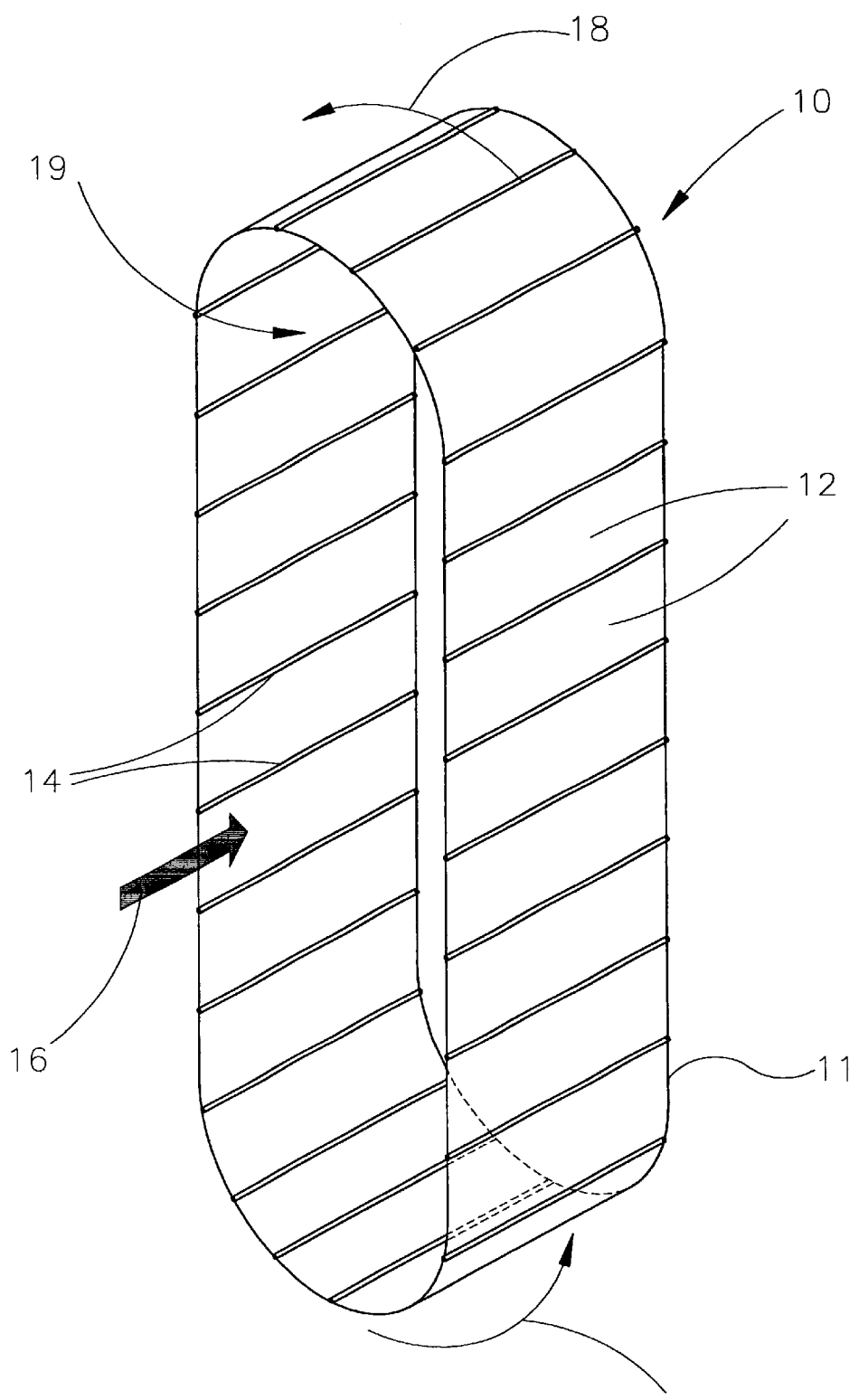
FIG. 1 is a perspective view of a conventional screen arrangement.

Referring to FIG. 1, a conventional screen arrangement, referred to generally as 10, for use in a sewage treatment plant includes a number of screen panels 12, each panel 12 being formed from a perforated metal sheet. The screen panels 12 are connected so as to form a continuous loop providing a belt screen 11, each screen panel 12 being connected to the adjacent screen panels, one on each side, by hinging means 14. Conveniently, the hinging means 14 may be in the form of lugs (not shown in detail), arranged along the edge of each panel 12, in which a retaining pin is received, the retaining pin passing through the lugs on adjacent panels 12 to secure adjacent panels together.

The continuous belt screen 11 is driven by a drive mechanism (not shown in FIG. 1) such that the screen panels 12 are conveyed upwardly on one side of the arrangement 10 and downwardly on the other side in a direction as indicated by arrows 18. Usually, the drive mechanism is housed within an upper head space 19 of the screen arrangement 10. Such screen arrangements are well known in the art and may be referred to as "continuous belt screens", as the screen panels 12 form a continuous belt, driven by a drive mechanism, which presents a substantially continuous, moving screening area to the input sewage flow.

Figure 2:
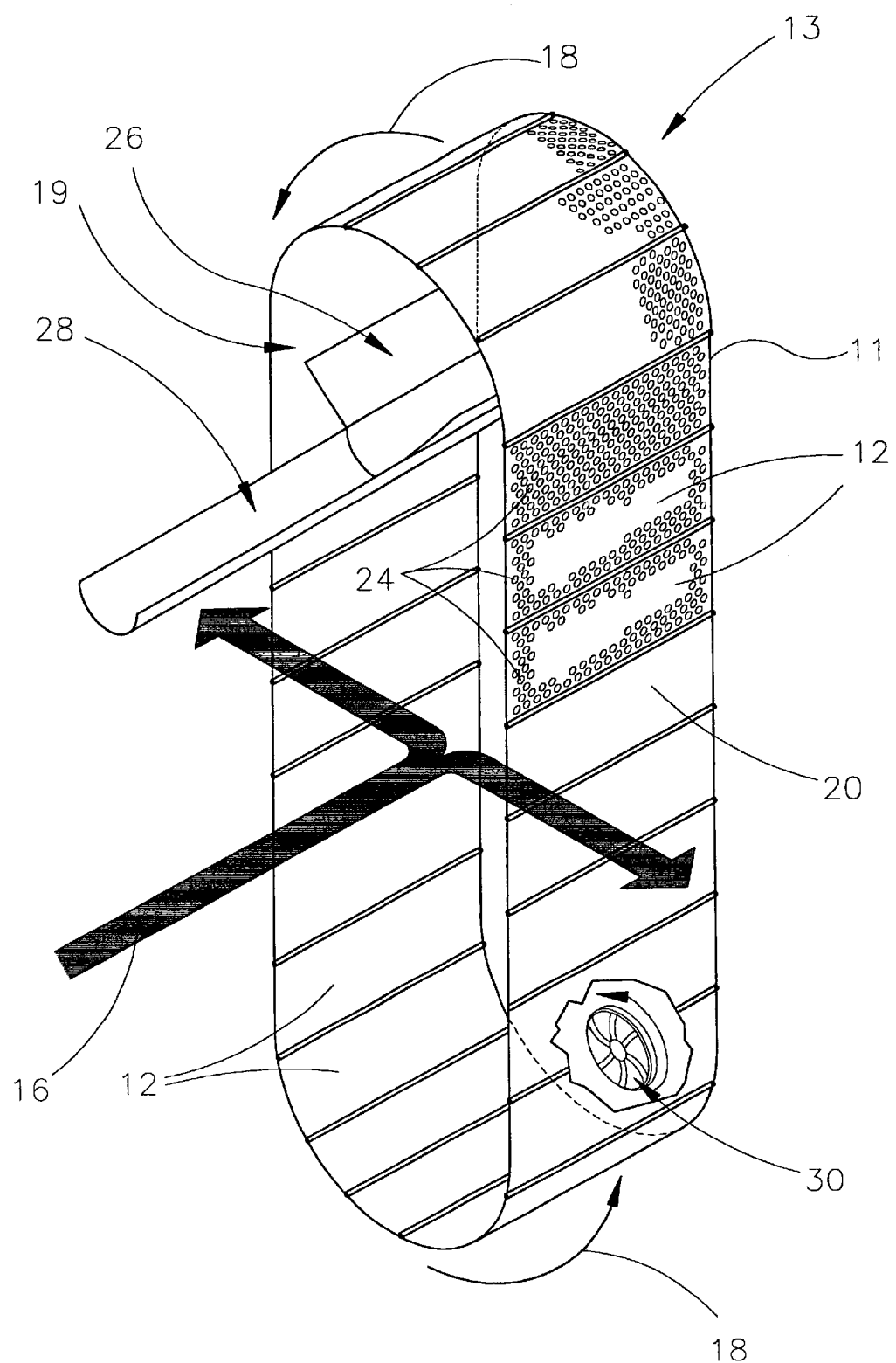
FIG. 2 is a perspective view of a first embodiment of the apparatus of the present invention.

FIG. 2 is a first embodiment of the sewage screening apparatus of the present invention, including the screen arrangement 10 shown in FIG. 1. For clarity, not all of the screen panels 12 forming the belt screen 11 are shown in FIG. 2. The screen arrangement 10 is housed in the main sewage flow channel (not shown) at the input stage of the sewage treatment plant. The screen arrangement 10 forms an enclosed region into which the sewage flow, represented by arrow 16, is introduced, the region being enclosed on either side and the base by the belt screen 11 and to the rear by a back plate 20. The sewage flow 16 flows into the channel and floods the lower part of the screen arrangement forming the base region.

At this stage the sewage flow 16 contains solid materials (not shown), such as rags, paper, plastics materials and stones, which cannot be processed by the treatment plant. The perforations 24 of the screen panels 12 forming the belt screen 11 enable the liquid phase of the sewage to pass through the panels 12 onward to the subsequent processing stages of the treatment plant. However, the perforations are such that solid materials in the sewage flow 16, having a greater dimension than the perforations, are captured. The liquid phase of the sewage is therefore passed out from the screen arrangement 10 through the continuous belt screen 11 on each side and through that part at the base, whilst the screenings are retained.

Figure 3:
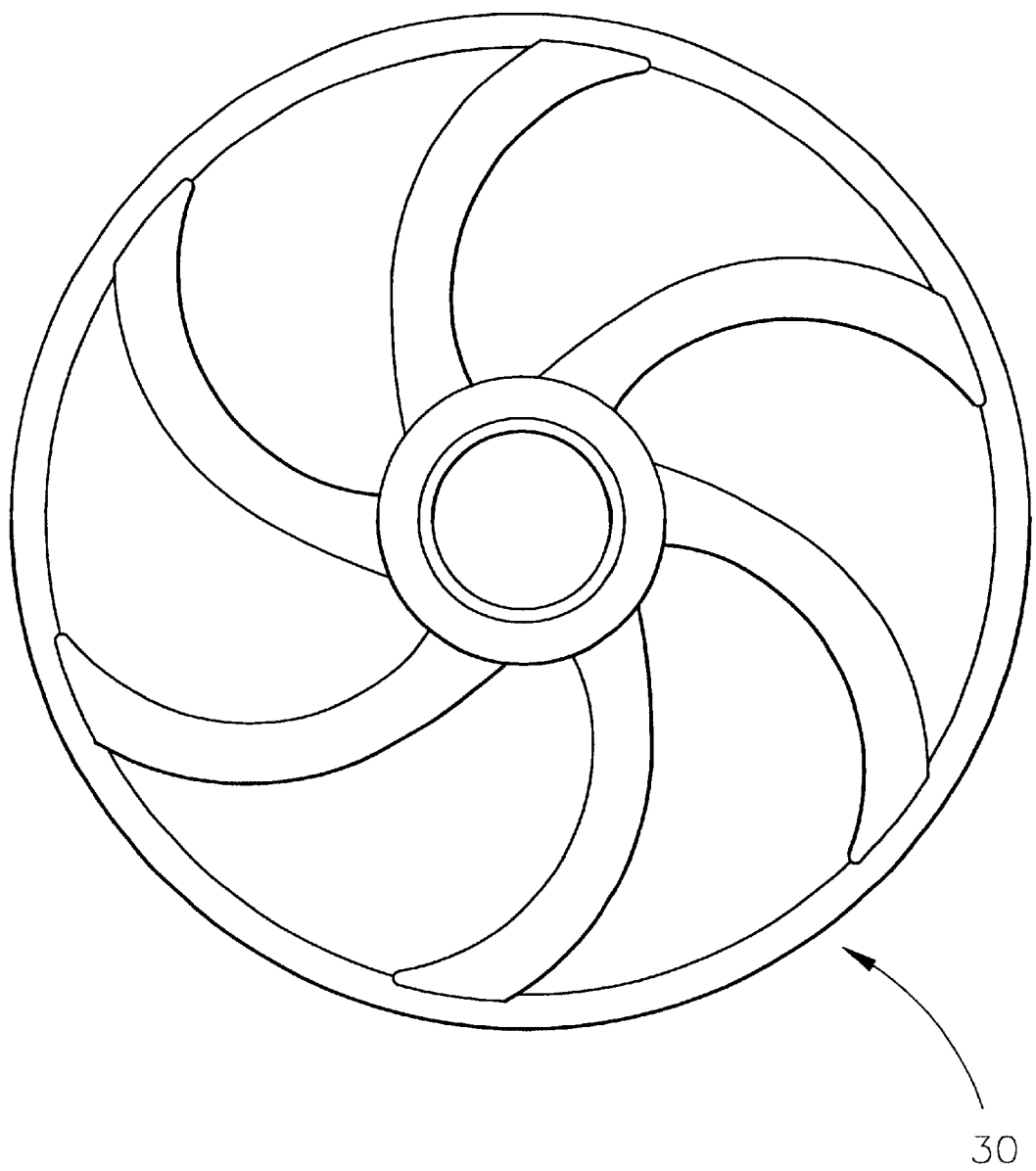
FIG. 3 is a view of the front face of an impeller device forming part of the apparatus shown in FIG. 2.

The apparatus also includes a rotary impeller 30, or agitator, mounted in the back plate 20 of the screen arrangement 10 such that the impeller 30 is located within the screen arrangement 10. The impeller 30 is driven by a water-tight, submersible motor (40 in FIG. 4) and, in use, imparts a rigorous swirling motion to the contents of the base region of the screen arrangement, thus creating a turbulent effect. FIG. 3 shows a view of the front face of an impeller device 30 which is located within the screen arrangement 10.

Owing to the location of the impeller 30 within the screen arrangement 10, a large proportion of the sewage flow 16 flowing into the screen arrangement 10 is introduced directly into the region of turbulence provided by the impeller action. Screenings within the sewage flow are therefore subjected to an intense swirling action. The swirling motion serves to "wash" the screenings in the sewage flow such that any organic materials attached thereto, such as faecal contaminants, are washed therefrom. The swirling motion also assists in breaking organic materials into a finely comminuted form, thereby serving to liquefy organic materials removed from the screenings.

The washing action generated by the impeller 30 is particularly effective due to the location of the impeller device 30 within the screen arrangement 10. The sewage flow entering the screen arrangement 10 is contained within the base region of the screen arrangement 10, prior to the passage of the liquid phase of the sewage through the screen panels 12, such that the base of the arrangement remains flooded. Screenings contained within the sewage flow therefore remain waterborne in the region of turbulence for a period of time, prior to removal by the screen panels 12, during which they are subjected to a continuous washing action by means of the turbulence. Furthermore, re-cycling flow patterns are created within the flow which serve to re-introduce the screenings to the region of turbulence.

In addition to the removal of faecal contaminants from the screenings by washing, the turbulence created by the impeller 30 has a liquefying effect on the contaminants such that, when liquefied, they can be passed through the perforations 24 of the belt screen 11 with other liquid sewage to the subsequent processing stages. The retention of faecal materials within the liquid sewage flow ensures that the biological loading for the treatment plant is sustained.

Hooks or prongs (not shown) are arranged internally on the belt screen 11 at spaced locations around the loop. Preferably, the hooks are grouped together to form rows of hooks spaced internally around the loop. The hooks may be located between adjoining screen panels 12, although they need not be included between each of the adjoining panels 12. The hooks are spaced so as to discourage removal of faecal solids from the sewage flow, thus allowing such faecal solids to be liquefied by the influence of the turbulence within the base of the screen arrangement.

As the belt screen 11 is moved continuously by means of the drive mechanism, the hooks capture the screenings within the flow. Thus, having already been washed by the turbulence created in the base region of the screen arrangement, the screenings are conveyed upwardly to the head space 19 in the upper part of the screen arrangement 10.

The apparatus includes a hopper 26, housed within the head space 19, in which captured, washed screenings are dislodged from the belt screen 11. Removal of the captured screenings from the belt screen 11 may be effected by means of a rotary brush housed within the head space 19, as will be described in further detail hereinafter. Screenings are output from the hopper 26 into a launder 28 for carrying the screenings to the subsequent compaction stage. Owing to the turbulence generated by the impeller 30, the screenings are substantially free from any organic materials when they are captured and discharged into the launder 28.

Figure 4:
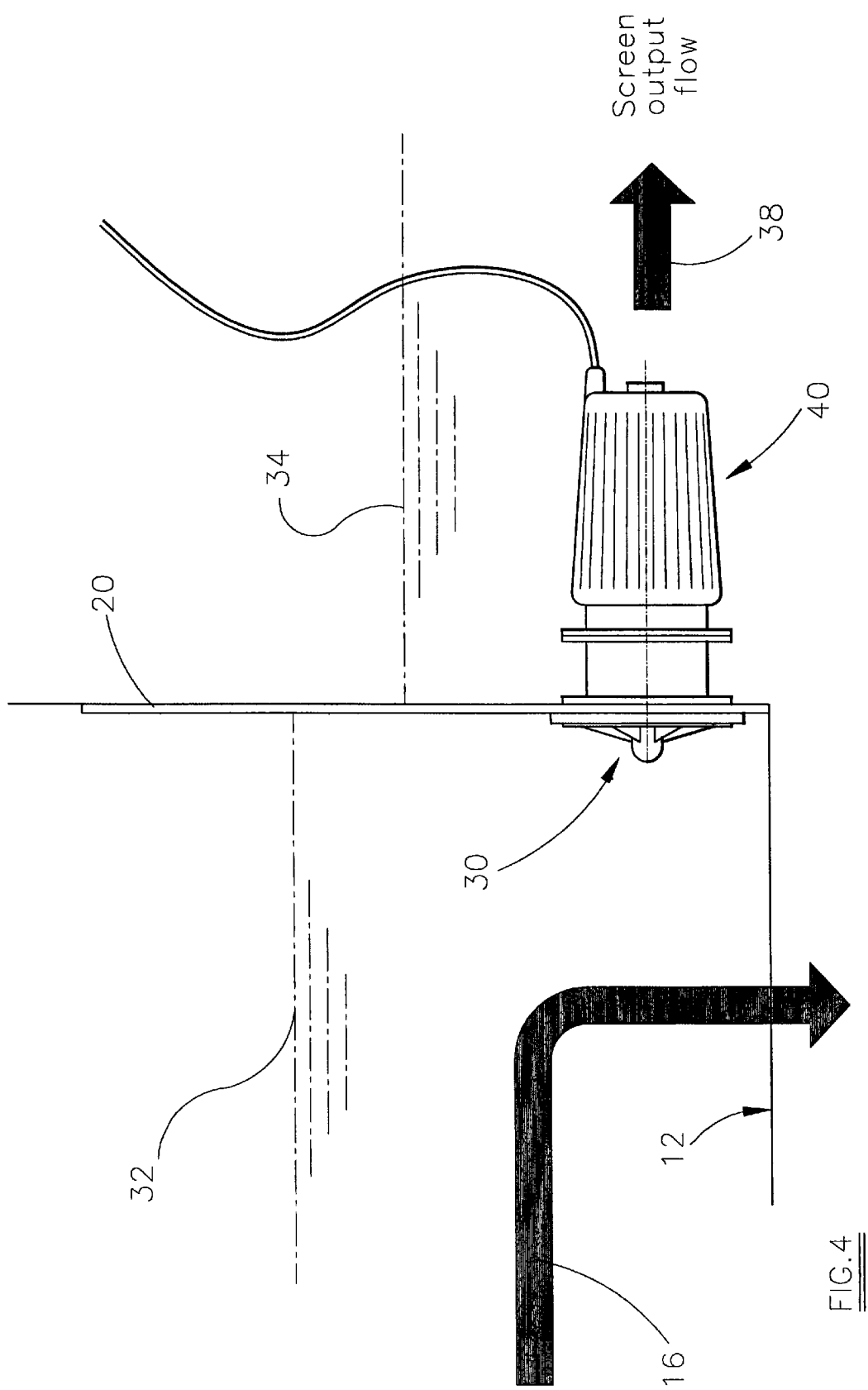
FIG. 4 is a side view of a part of the apparatus in FIG. 2.

FIG. 4 is a side view of a part of the screening apparatus shown in FIG. 2, in which it can be seen that the water level 32 inside the screen arrangement 10 is above that of the downstream water level 34 after the screenings have been removed from the sewage flow 16. It can be seen that, as well as passing through the belt screen forming the side walls, the sewage flow 16 passes out through the screen panels 12 at the base of the belt screen. The screened sewage flow, represented by arrow 3 8, passes onwards to the subsequent treatment stages.

As a result of the large screening area presented to the sewage flow, provided by belt screen 11 on two vertical sides of the screen arrangement 10, the head loss (i.e. the difference in water level between sewage inside the screen arrangement and downstream of the screen arrangement) is minimised. The apparatus therefore has a large sewage flow capacity and, typically, is capable of screening an input sewage flow at a rate of up to 3000 liters per second. The apparatus is therefore particularly suitable for use in areas having a high population. Furthermore, owing to the increased sewage flow capacity, the apparatus is suitable for use as a primary sewage screening apparatus. It is preferable for the impeller 30 to be driven by a submersible motor 40, thus enabling the motor 40 to be mounted within the main body of the sewage channel. The motor is preferably located outside the screen arrangement.

Figure 5:
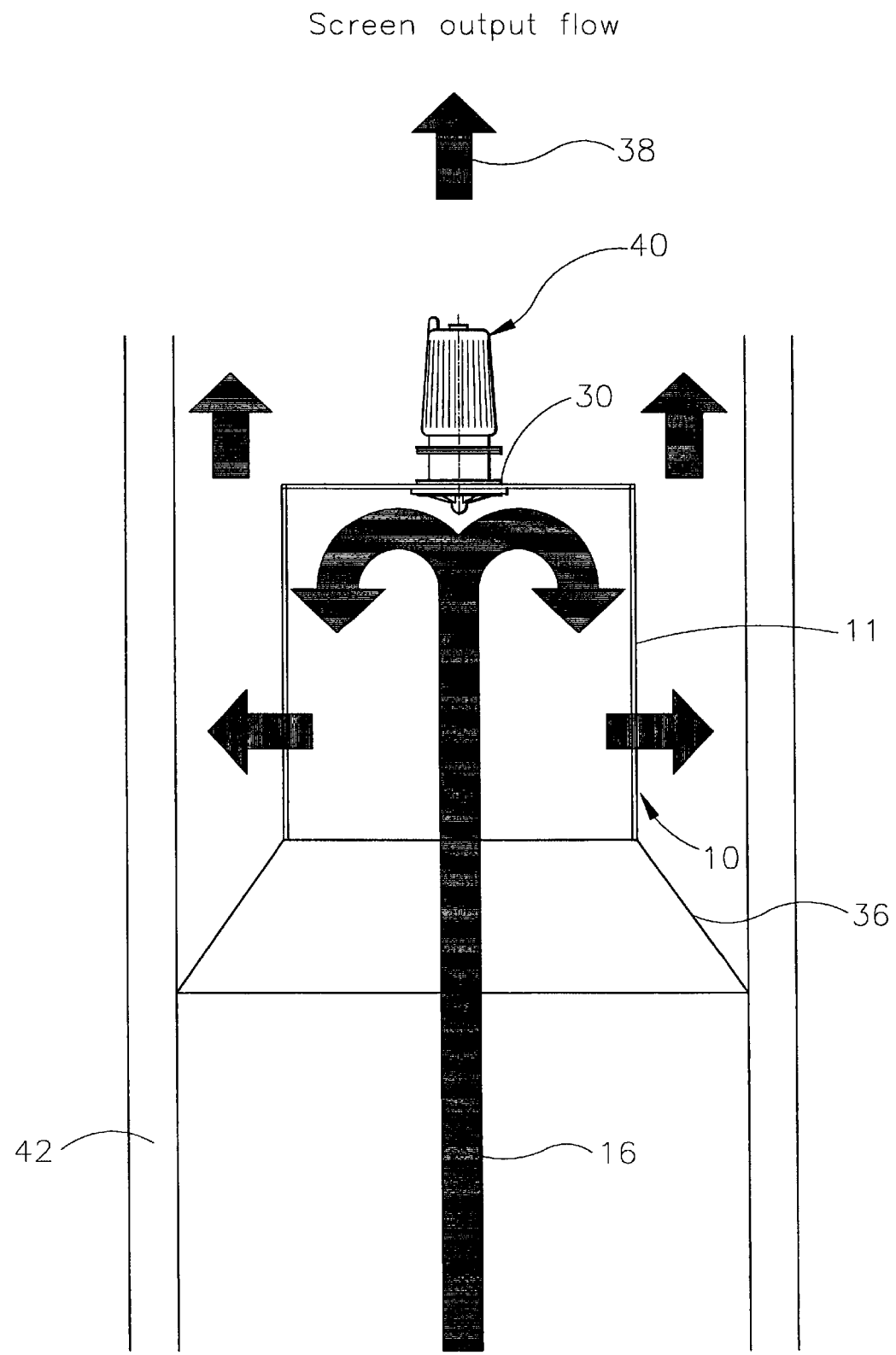
FIG. 5 is a plan view of the part of the apparatus shown in FIGS. 2 and 4.

FIG. 5 is a plan view of the apparatus in which the passage of sewage flow into the screen arrangement 10 can be seen more clearly. In particular, the sewage flow 16 is introduced directly into the region of turbulence provided by the impeller 30. Seal points 36, between the belt screen 11 and the main channel 42, separate the input sewage flow 16 from the screened output flow 38.

Conventionally, a continuous belt screen is driven by rotating wheel mechanism located within the head space at the top of the screen arrangement. In the present invention, the drive mechanism for the belt screen (not shown in the Figures) is preferably mounted externally to the screen arrangement 10, the drive mechanism engaging with one side of the belt screen prior to it passing through the head space 19 to effect the driving connection.

External mounting of the drive mechanism provides several advantages. Firstly, there remains a large volume of space towards the top of the screen arrangement within which a rotary brush may be mounted. The rotary brush brushes the captured screenings from the screen panels 12 as the belt screen 11 passes through the head space 19. Furthermore, as the drive mechanism is mounted externally, contamination of the drive mechanism by the effluent is avoided.

Figure 6:
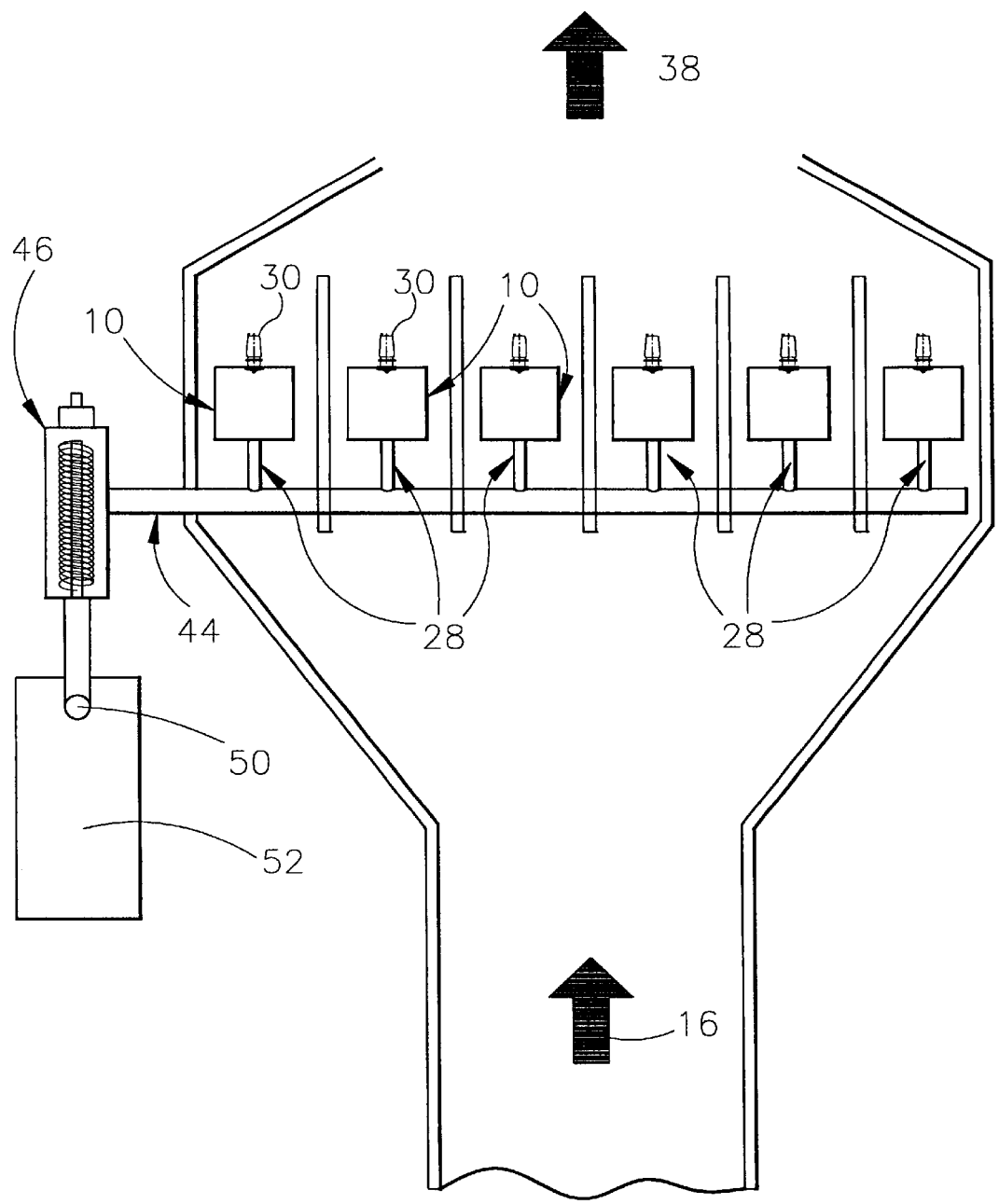
FIG. 6 is a plan view of a second embodiment of the apparatus of the present invention.

Referring to FIG. 6, according to another aspect of the invention, several screen arrangements 10 may be employed within the main sewage channel, each screen arrangement having a belt screen 11 and each having an associated impeller or impeller devices 30 located therein. As described previously, each screen arrangement 10 has an associated hopper (not shown in FIG. 4) and launder 28 for carrying screenings output from each screen arrangement 10 to a common launder 44. The common launder 44 carries the washed screenings to the subsequent compaction stage. For example, the washed screenings may be carried to a screw compactor 46 for compacting the screenings. The compacted screenings can then be disposed of from the screw compactor outlet 50 into a container 52 in which they can be removed from the site.

Alternatively, the compacted screenings may be output from outlet 50 into an incinerator. Typically, the screw compactor into which the washed screenings are discharged may take the form of the screw compactor described in EP 0 557 030.

When several screen arrangements are housed within the main sewage flow channel, each having an associated impeller, it is possible to process very high sewage flow rates, up to around 10,000 liters per second.

The perforated screen panels 12 making up the belt screen 11 need not be formed from metal, but may be formed from any other suitable material, such as plastic. The launder (28,44) used for conveying screenings from the belt screen to the subsequent dewatering and compaction stage may be replaced with another suitable conveyance means, such as a screw conveyor. The screw conveyor may also form the screw compactor, as described in EP 557 030.

It will be appreciated that more than one impeller may be included in the or each screen arrangement. In particular, the preferred number of impellers will depend on the size of the screen arrangement and the volume of sewage flow to be passed therethrough.

I claim:

1. A sewage screening apparatus which receives, in use, a sewage flow comprising;

a screen arrangement having a continuous belt screen for capturing screenings contained within the sewage flow to enable their subsequent removal therefrom; and an impeller for generating a turbulence effect within the sewage flow to effect washing of the screenings contained within the sewage flow prior to their removal therefrom, wherein the impeller is located within the screen arrangement.

2. The sewage screening apparatus as claimed in claim 1, wherein the apparatus takes the form of a primary sewage screening apparatus in which screenings are washed in the main sewage channel prior to their removal therefrom.

3. The sewage screening apparatus as claimed in claim 1, wherein the impeller is a rotary impeller for generating a turbulence effect within the sewage flow.

4. The sewage screening apparatus as claimed in claim 3, wherein the screen arrangement has a base region at its lower part and a head space at its upper part, the rotary impeller being arranged within the base region of the screen arrangement.

5. The sewage screening apparatus as claimed in claim 4, wherein the belt screen passes through the head space of the screen arrangement.

6. The sewage screening apparatus as claimed in claim 3, wherein the rotary impeller is driven, is use, by a motor located outside the screen arrangement.

7. The sewage screening apparatus as claimed in claim 3, wherein the screen arrangement includes a back plate, at the rear of the arrangement, on which the rotary impeller is mounted such that the impeller is located within the screen arrangement.

8. The sewage screening apparatus as claimed in claim 1, further comprising a drive mechanism for driving the belt screen, the drive mechanism being mounted externally of the screen arrangement.

9. The sewage screening apparatus as claimed in claim 1, further comprising a launder into which screenings output from the screen arrangement are delivered.

10. The sewage screening apparatus as claimed in claim 1, further comprising a screw conveyor into which screenings output from the screen arrangement are delivered.

11. The sewage screening apparatus as claimed in claim 1, further comprising:
    two or more screen arrangements arranged within a main sewage channel, wherein each screen arrangement has a continuous belt screen for capturing screenings to be removed from the sewage flow and an impeller.

12. The sewage screening apparatus as claimed in claim 1, further comprising a screw compactor into which washed screenings, removed from the screen arrangement, are discharged for dewatering and compaction prior to disposal.

13. The sewage screening apparatus as claimed in claim 1 wherein the apparatus includes one or more additional impellers.

* * * * *